(12) United States Patent
Dussud et al.

(10) Patent No.: US 7,707,232 B2
(45) Date of Patent: Apr. 27, 2010

(54) IMPLEMENTATION FOR COLLECTING UNMANAGED MEMORY

(75) Inventors: Cedric Patrick Dussud, Seattle, WA (US); Yin Xie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 11/129,545

(22) Filed: May 13, 2005

(65) Prior Publication Data

US 2006/0259528 A1    Nov. 16, 2006

(51) Int. Cl.
G06F 12/02    (2006.01)

(52) U.S. Cl. .............. 707/819; 711/159; 711/E12.012; 707/999.206

(58) Field of Classification Search .................. None
See application file for complete search history.

(56) References Cited

U.S. PATENT DOCUMENTS

| | | | | |
|---|---|---|---|---|
| 5,604,902 | A * | 2/1997 | Burkes et al. ............... | 707/206 |
| 5,765,174 | A * | 6/1998 | Bishop ...................... | 707/206 |
| 6,065,020 | A * | 5/2000 | Dussud ...................... | 707/206 |
| 6,300,962 | B1 * | 10/2001 | Wishoff et al. ............. | 345/543 |
| 6,314,435 | B1 * | 11/2001 | Wollrath et al. ............. | 707/206 |
| 6,598,141 | B1 * | 7/2003 | Dussud et al. .............. | 711/170 |
| 6,618,738 | B2 * | 9/2003 | Ozawa et al. ............... | 707/206 |
| 6,748,503 | B1 * | 6/2004 | Morrison .................... | 711/159 |
| 6,763,440 | B1 * | 7/2004 | Traversat et al. ............ | 711/159 |
| 6,865,657 | B1 * | 3/2005 | Traversat et al. ............ | 711/170 |
| 6,898,611 | B1 * | 5/2005 | Dussud et al. .............. | 707/206 |
| 7,051,026 | B2 * | 5/2006 | Berry et al. .................... | 707/8 |
| 7,634,510 | B2 * | 12/2009 | Marwah ..................... | 707/202 |
| 2002/0165870 | A1 * | 11/2002 | Chakraborty et al. ....... | 707/206 |
| 2003/0191783 | A1 * | 10/2003 | Wolczko et al. ............. | 707/206 |
| 2004/0088338 | A1 * | 5/2004 | Garthwaite ................. | 707/206 |
| 2006/0095427 | A1 * | 5/2006 | Dickenson .................... | 707/6 |
| 2006/0167961 | A1 * | 7/2006 | Fox ........................... | 707/206 |

OTHER PUBLICATIONS

Richter, Jeffrey., "Garbage Collection: Automatic Memory Management in the Microsoft .NET Framework", Dec. 2000, MSDN Magazine, December Edition, pp. 1-8.*

* cited by examiner

Primary Examiner—Pierre M Vital
Assistant Examiner—Christopher P Nofal
(74) Attorney, Agent, or Firm—Workman Nydegger

(57) ABSTRACT

A method and system for garbage collecting managed and unmanaged memory that is no longer referenced. The time between allocations is compared with a threshold to determine if the garbage collector needs to collect unused memory. Unmanaged memory referenced by objects in the unused managed memory may be freed during the collection.

16 Claims, 5 Drawing Sheets

IMPLEMENTATION FOR COLLECTING UNMANAGED MEMORY

FIELD OF THE INVENTION

The invention relates generally to computers, and more particularly to memory management.

BACKGROUND

Many modern programs execute in an environment in which memory is managed by a memory manager known as a garbage collector. In response to a request for memory, the garbage collector finds a sufficient amount of free memory and allocates it to the program. The program may then use the memory until it no longer needs the memory. The program may not explicitly inform the garbage collector that it is done using the memory. Instead, periodically, the garbage collector performs a garbage collection.

The garbage collector is responsible for determining which memory blocks are no longer being used by the program. The garbage collector may do this by traversing the objects associated with a program and marking the memory blocks they are using. If an allocated memory location is no longer referenced by an object of the program, the garbage collector may indicate that the allocated memory location may be returned to the free pool of memory locations.

The garbage collector may collect on a periodic schedule. If an object remains referenced at the end of a period, the garbage collector may determine that the object is longer-lived and place it with a collection of objects that are checked less frequently to determine if they are still referenced by the program. If an object in this collection is still referenced when the garbage collector checks the collection, the object may be moved to yet another collection of objects which is checked even less frequently. This is known as generational garbage collection, and each of these collections are known as generations. The difference in time between checking objects in one generation as compared to another generation may be 100:1 or more. Garbage collectors use various heuristics to decide when to collect various generations.

Unfortunately, objects that are in any generation may cease to be referenced immediately or shortly after being placed in the generation and continue to tie up memory until garbage collection for their generation occurs. If an object in an infrequently-collected generation has a larger size than the garbage collector is aware of, the garbage collector's heuristics may not work well and this can cause a great deal of memory to be consumed. Examples include, but are not limited to, when a small managed object references a very large amount of unmanaged memory.

What is needed is an improved method and system for tracking and garbage collecting memory of a size larger than the garbage collector is aware of.

SUMMARY

Briefly, in one aspect, the present invention provides a method and system for properly garbage collecting memory that is no longer referenced. In managed code environments it is possible for managed objects to allocate unmanaged memory. A garbage collector may be unaware of the unmanaged memory and may thus choose not to collect or defer collection of the managed objects, essentially leaking memory. An aspect of the present invention tracks unmanaged memory allocations by managed objects and forces a garbage collection when the time between subsequent allocations is greater than a threshold. Unmanaged memory referenced by managed memory may be freed during the collection.

Other aspects will become apparent from the following detailed description when taken in conjunction with the drawings, in which:

DETAILED DESCRIPTION

Exemplary Operating Environment

Figure 1:
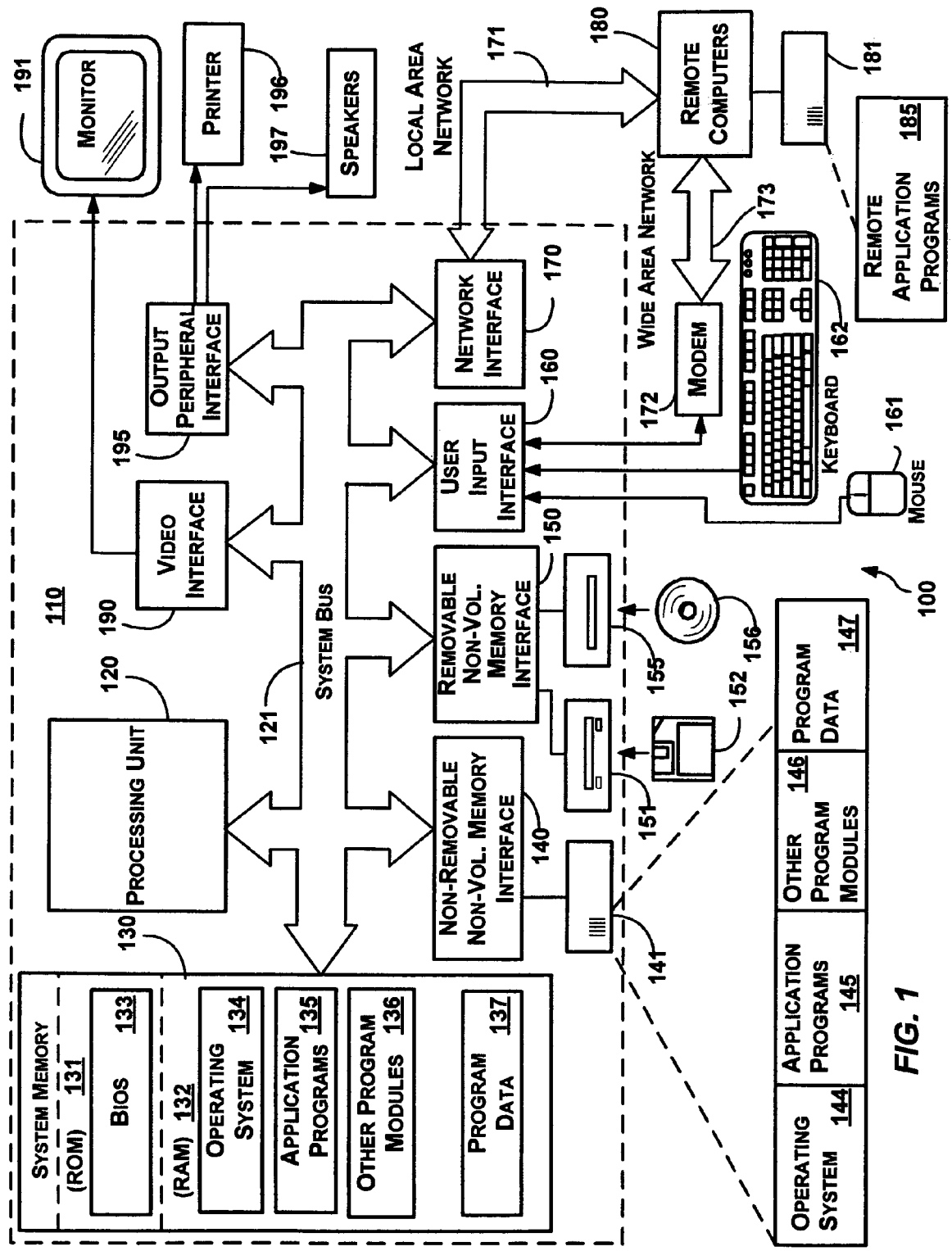
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Memory Management

When writing a program in unmanaged code, a developer may explicitly allocate and free memory for each object used by the program. If the program fails to allocate memory for an object and then attempts to use the object (e.g., via a pointer), errors may occur. If the program fails to free memory after the object is no longer needed, the memory may become inaccessible for future allocations as a memory allocator may believe that the memory is still in use. Not freeing memory after it is no longer needed is sometimes called a memory leak and may lead to performance degradation or a system crash.

In managed code, a developer may not be required to explicitly release managed memory. For example, the program may create an object, use the object as long as desired, and then cease referencing the object. A memory manager known as a garbage collector may allocate memory for the object. Some time after the program stops referencing the object, the garbage collector may determine whether the object is referenced and, if not, may free memory associated with the object.

In a managed code, a program may reference an object until the object goes out of scope (e.g., a method is exited) or until the program causes all variables associated with the object to be associated with nothing (or null)).

Figure 2:
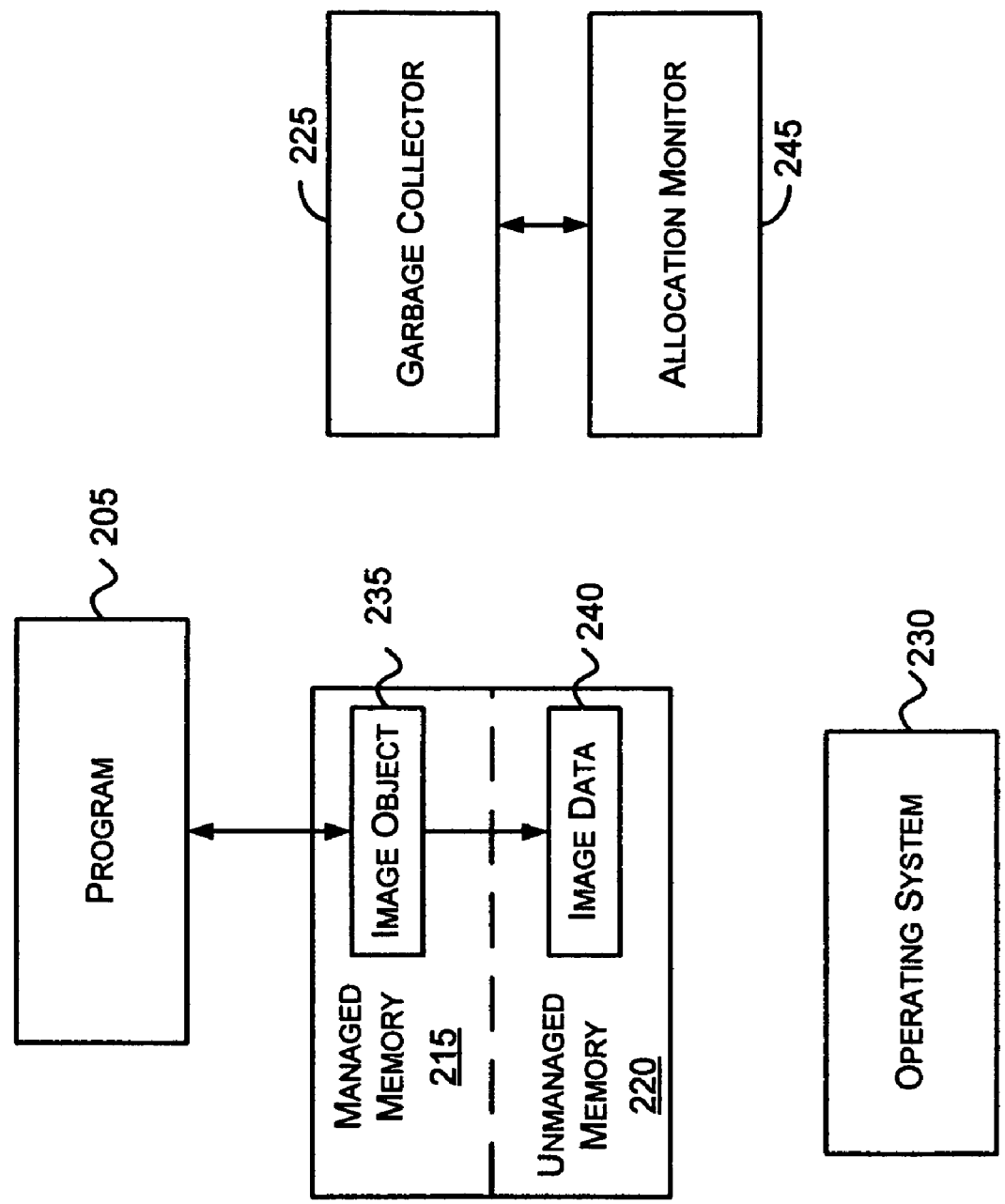
FIG. 2 is a block diagram that generally represents exemplary components of an environment in which the present invention may operate in accordance with various aspects of the invention.

FIG. 2 is a block diagram that generally represents exemplary components of an environment in which the present invention may operate in accordance with various aspects of the invention. The environment may include a program 205, memory 210, a garbage collector 225, an allocation monitor 245, and an operating system (OS) 230. The memory 210 may include managed memory 215 and unmanaged memory 220.

In operation, the program 205 may request that an object be created via an API or declaration. The garbage collector 225 may then locate available memory, find a suitable block of memory, and return a reference by which the program 205 may access the memory.

A garbage collector (e.g., garbage collector 225) may periodically locate memory that is no longer referenced so that the memory can be returned to a free pool of memory managed (e.g., managed memory 215) by the garbage collector 225.

Memory blocks associated with objects may be associated with 3 or more sets (sometimes called "generations"). The first generation (sometimes called "gen 0") may be associated with memory blocks that have most recently been allocated (e.g., since the garbage collector 225 last performed a collection). When collecting free memory blocks associated with gen 0, the garbage collector 225 may associate any memory blocks not returned to the free pool with the second generation (sometimes called "gen 1").

The garbage collector 225 may attempt to collect free memory blocks from the memory blocks associated with gen 1 on a less frequent basis than collecting free memory from the memory blocks associated with gen 0. This may be done to avoid processing overhead as performing a garbage collection frequently may consume substantial processing resources. Furthermore, if a program continues to reference a memory block for more than one generation, it may be more likely that the memory block may be used for a longer-lived object. Attempting to collect a memory block associated with a longer-lived object too frequently may waste valuable resources.

If the garbage collector 225 chooses to collect free memory blocks from the gen 1 memory blocks and finds memory blocks still referenced by objects, the garbage collector 225 may associate these memory blocks with yet another generation (sometimes called "gen 2"). The garbage collector 225 may attempt to collect free memory blocks from the memory blocks associated with gen 2 even less frequently than the memory blocks associated with gen 1. In some implementations, a garbage collector 225 may collect free memory associated with gen 0 ten times more frequently than the garbage collector 225 collects free memory associated with gen 1.

Furthermore, the garbage collector 225 may collect free memory associated with gen 1 ten times more frequently than the garbage collector 225 collects free memory associated with gen 2.

Sometimes, the amount of memory associated with a generation influences how often the garbage collector 225 chooses to collect free memory associated with the generation. For example, if the memory blocks that are associated with gen 2 consume a large portion of available memory (e.g., many megabytes), the garbage collector 225 may more frequently attempt to collect free memory associated with the gen 2 generation because of the possibility of reclaiming a large chunk of memory. If the memory blocks associated with gen 2 consume a relatively small portion of memory, on the other hand, the garbage collector 225 may not attempt to collect any free memory blocks associated with gen 2 because of the relatively small amount of memory that may be obtained for the work performed.

More or fewer generations and other frequencies for collecting free memory blocks associated with each generation may be employed without departing from the spirit or scope of the present invention.

A problem arises when a small object (e.g., image object 235) stored in the managed memory 215 allocates a large amount of memory (e.g., image data 240) from the unmanaged memory 220. The garbage collector is typically unaware that the managed object has allocated unmanaged memory. If this object lives long enough to be associated with the gen 2 generation, the object may not be returned to the free pool of memory until the program 205 closes. If there is more than one of these small objects which allocate a large amount of unmanaged memory, the effects on free memory are magnified. In some modern programs, this may result in programs with hundreds of megabytes of memory allocated to them, even though they are only using a small portion of that memory. This is particularly true for program that access images.

The program 205 may request that the image object 235 be created by calling an API and passing the name of a file that includes the image. For example, a developer may place the following line of code in an application:

MyImage=newImage("file.jpg");

The API may then create the image object 235 in the managed memory 215 and may also decode the file, allocate a memory block from the unmanaged memory 220, place the image data 240 into the unmanaged memory 220, and register a finalizer for the image object 235 with the garbage collector. MyImage references the image object 235.

If the memory associated with the image object 235 is still referenced by the program 205, the memory is not freed. If the memory associated with the image object is not referenced by the program 205, the garbage collector 225 may call a finalizer of the image object. The finalizer may then free the memory associated with the image data 240 in the unmanaged memory 220 and return to the garbage collector 225. The garbage collector 225 may then return the memory associated with the image object 235 to a free pool for subsequent use.

Figure 3:
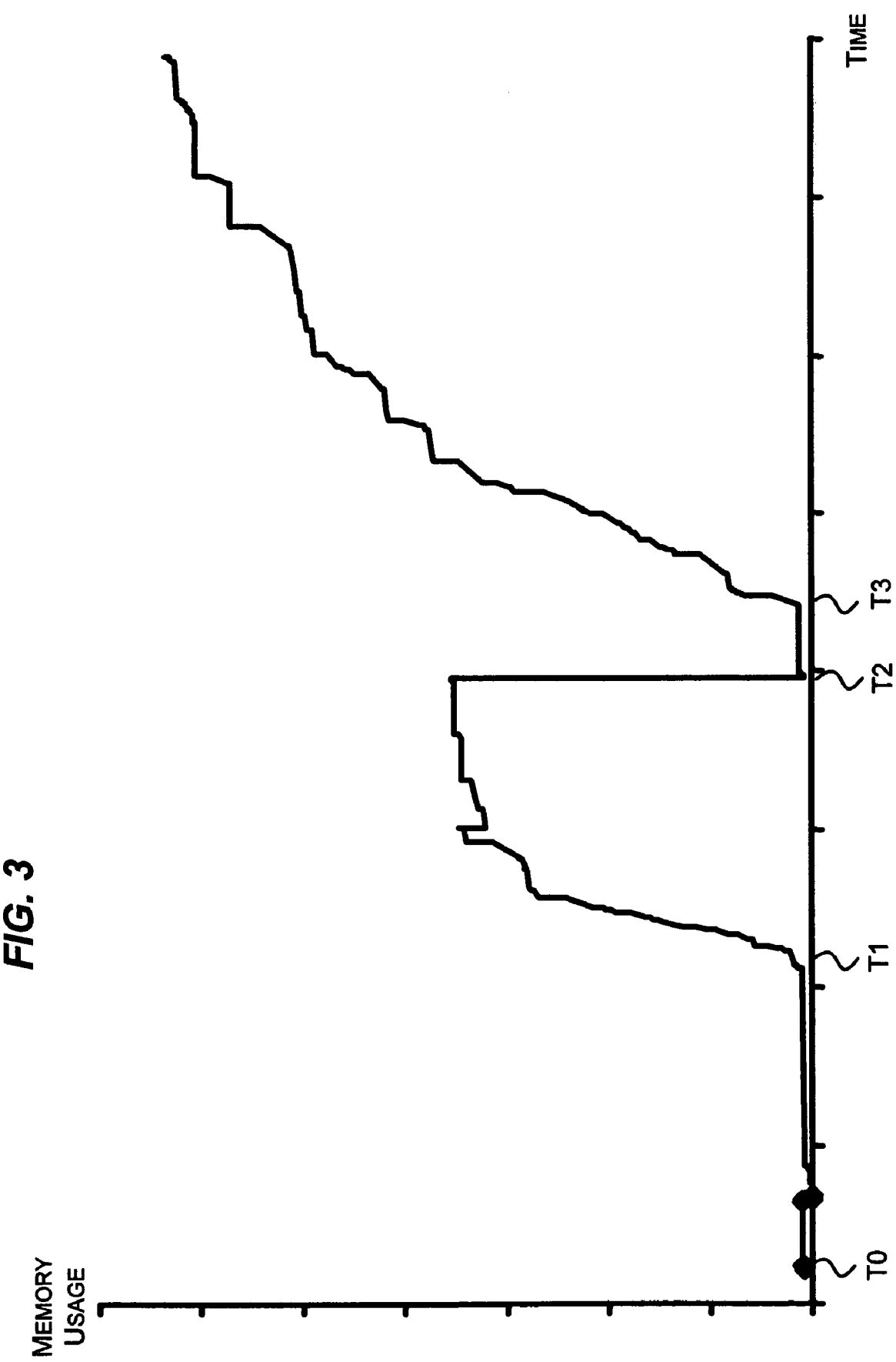
FIG. 3 is a graph showing memory usage for objects needed by an exemplary program over time in accordance with various aspects of the invention.

FIG. 3 is a graph showing memory usage for objects needed by an exemplary program over time in accordance with various aspects of the invention. The memory usage axis shows combined managed and unmanaged memory used each shown point. The graph assumes that memory is returned to the free pool immediately after the program no longer needs it.

At time T0, the program begins. At time T1, the program begins rapidly requesting memory. This may occur, for example, when loading a new Web page or requesting that the program displaying a page showing several images (e.g., viewing a photo album).

Shortly after T1, allocations occur relatively quickly as a program attempts to allocate memory for all objects needed to display a particular page. In faster computers, the time between allocations may be on the order of a few milliseconds. On slower computers, the time between allocations may be on the order of a few hundred milliseconds. On almost all machines, during typical allocations for images (e.g., a few megabytes each), the allocations will be closer than 1 second apart.

At time T2, the program suddenly stops using the memory it previously requested. For example, the user may navigate to a different window in the application. When navigating to the different window, the previously displayed images may no longer need to be displayed or retained in memory.

At time T3, the program begins rapidly requesting memory again. The program may do so in response to the images associated with the window to which the user navigated, for example.

Because the graph assumes that memory is returned to the free pool immediately after the program no longer needs it, the graph may not represent the actual memory usage. For example, referring to FIGS. 2 and 5, a garbage collector 225 may not collect unused memory right after the drop at T2. Furthermore, because the garbage collector 225 may examine managed memory, the garbage collector 225 may not even attempt to collect the unused memory as the managed memory used by the objects may be very small and not considered worth checking even though the unmanaged memory associated with the objects may be very large.

To cause the garbage collector 225 to collect the unused managed memory (and hence call finalizers that release the unused unmanaged memory), the allocation monitor 245 may track allocations and the time between allocations. The allocation monitor 245 may be part of a set of components that provide enhanced graphics functionality. For example, instead of including code to animate an image, a program may simply call an API that accesses the set of components to animate the image.

When an allocation is less than or equal to an allocation threshold (e.g., 1 second), the allocation monitor may determine that memory is being rapidly allocated to be used for a while by the program. When an allocation occurs after the most recent allocation at a time greater than the allocation threshold, the allocation monitor may determine that the program has stopped referencing the memory it previously used (e.g., in response to the user navigating to a new page) and is allocating memory for another use (e.g., to display a new page).

At this point, the allocation monitor 245 may cause the garbage collector 225 to collect any unused memory. The allocation monitor 245 may request that the garbage collector 225 perform a gen 1 or gen 2 (or higher generation if it exists) garbage collection. If the memory is no longer in use, this may result in substantial unmanaged memory being returned to the free pool.

The allocation monitor 245 may also track how long it has been since the last gen 1 or gen 2 (or higher if it exists) garbage collection. If the time is longer than a collection threshold (e.g., 30 seconds or more), the allocation monitor 245 may cause the garbage collect 225 to collect unused memory. Some programs may continue to allocate frequently over an extended period of time, even though they stopped referencing portions of the memory over the time. If a higher level collection (e.g., gen 2) has not occurred for a substantial amount of time, a gen 2 collection may need to be performed in order to reclaim the unreferenced memory. Even if the program is still using all its allocated memory, a gen 2 garbage collection every collection threshold period may not noticeably degrade performance.

The allocation threshold and garbage collection thresholds may be fixed by a developer during development, may be computed based on a computer's characteristics (e.g., memory size, speed, and so forth), may be tuned based on success in freeing unused memory on a particular computer, or may be selected (e.g., by a user, computer developer, or system administrator).

Figure 4:
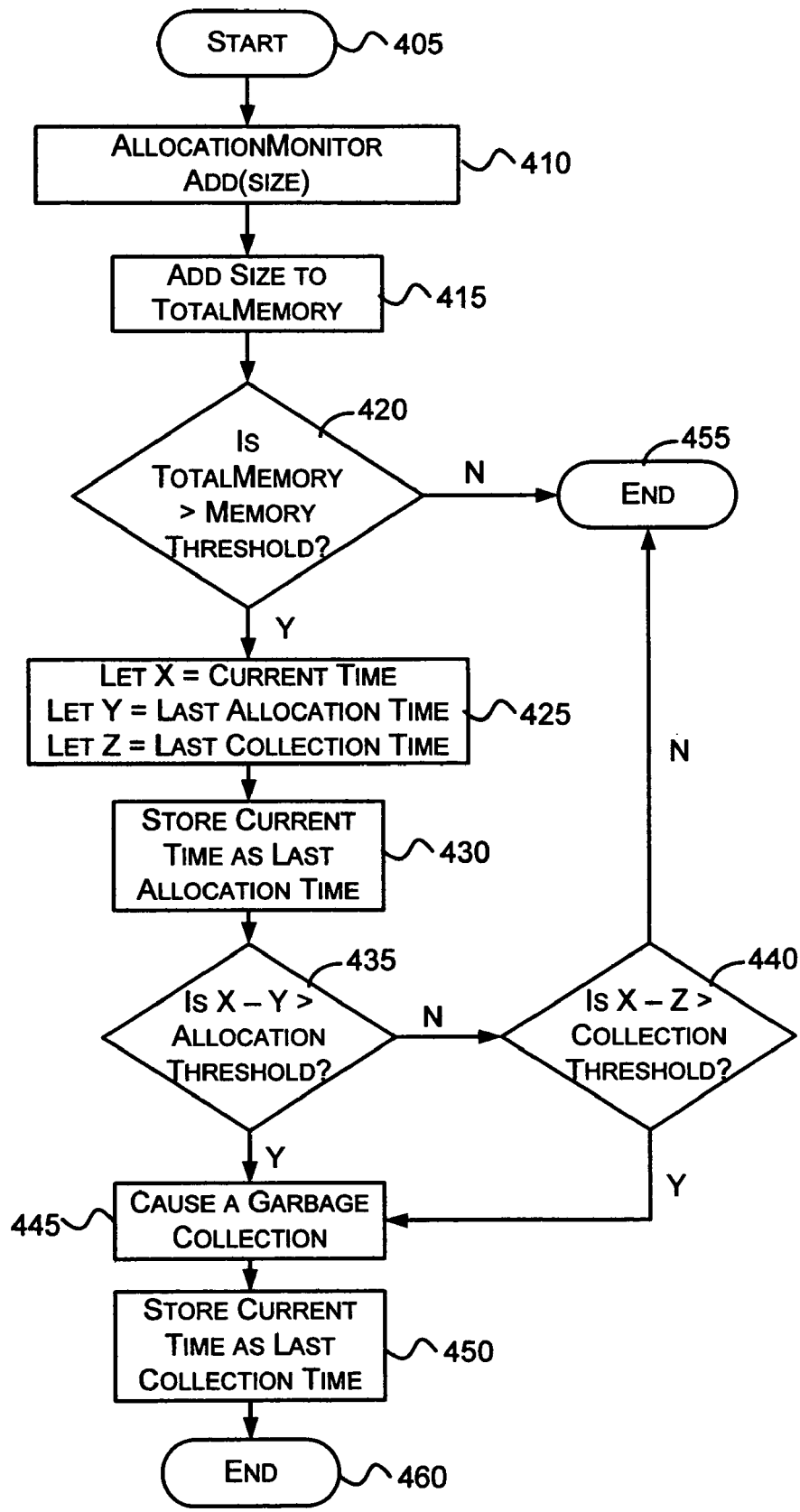
FIGS. 4 and 5 are flow diagrams that generally represent actions that may occur to efficiently garbage collect unused memory in accordance with various aspects of the invention
Figure 5:
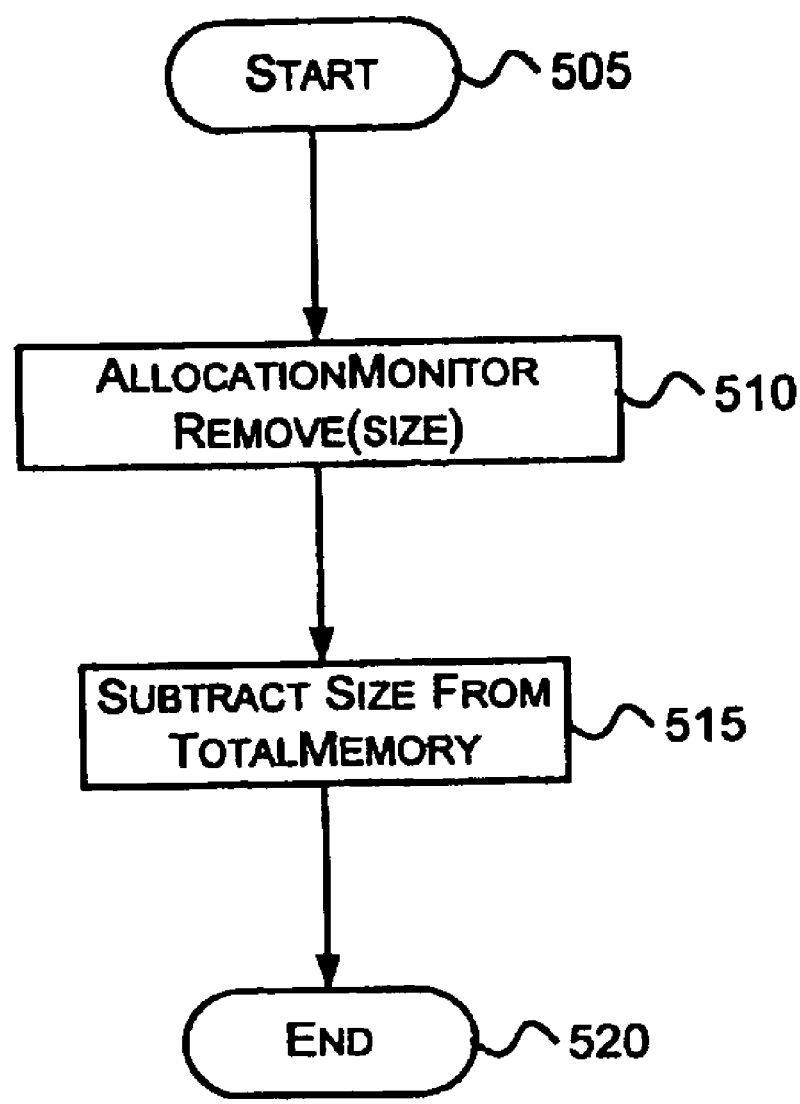

FIGS. 4 and 5 are flow diagrams that generally represent actions that may occur to efficiently garbage collect unused memory in accordance with various aspects of the invention. Turning to FIG. 4, at block 405, the actions start.

At block 410, an allocation monitor is called and passed the size of unmanaged memory associated with an object. The allocation manager adds the size to a variable (e.g., TotalMemory) that indicates the total amount of memory tracked by the allocation manager.

At block 420, a determination is made as to whether the TotalMemory is greater than a threshold (e.g., 500 KB or 1 MB). If so, the actions continue at block 425. If not, the actions continue at block 455. The threshold may be selectable (e.g., at or before run time) or fixed (e.g., at development time). When the total memory tracked by the allocation monitor is less than or equal to the threshold, no further actions need to be performed. This may be done, for example, to reduce overhead, particularly when memory usage is low.

At block 425, variables may be set to the current time, the last allocation time, and the last collection time. In other embodiments, these values are obtained during comparison blocks 435 and may not be assigned to additional variables.

At block 430, the allocation time of the current allocation is stored. This is done so that this value may be used in subsequent iterations of the actions described in conjunction with FIG. 4.

At block 435, a determination is made as to whether the current time the last allocation time is greater than an allocation threshold. If so, the actions continue at block 445; otherwise, the actions continue at block 440. As mentioned previously, when the time from the last allocation threshold is small, this may indicate that the program is in an allocation phase. When the time from the last allocation is relatively large, this may indicate that the program is in a new allocation phase that follows an old allocation phase.

At block 440, a determination is made as to whether the current time the last collection time is greater than a collection threshold. If so, the actions continue at block 445; otherwise, the actions continue at block 455. As mentioned previously, this may be done to collect unused memory in programs that quickly allocate memory (and stop referencing at least some of the memory) for an extended period of time.

At block 445, a garbage collector performs a garbage collection. The garbage collector may be instructed to collect garbage from any one or more generations.

At block 450, the last collection time is stored for use in subsequent iterations of the actions associated with block 440.

At blocks 455 and 460, the actions end. The actions described in conjunction with FIG. 4 may be repeated each time new memory is allocated. In some embodiments, the actions described in conjunction with FIG. 4 are performed when managed memory that references unmanaged memory is allocated. In some embodiments, the actions described in conjunction with FIG. 4 are performed when memory is allocated (both in managed and unmanaged memory) for an image object.

Turning to FIG. 5, the actions start at block 505. At block 510, the allocation monitor is called and passed a size parameter that indicates the amount of unmanaged memory that has been or is about to be freed. A finalizer that is called by a garbage collector before memory associated with an object in managed memory is returned to a free pool may call the method and pass the size prior to returning to the garbage collector.

At block 515, the size is subtracted from the total memory tracked by the allocation monitor. If this causes the total memory tracked to be less than or equal to the memory threshold discussed in conjunction with FIG. 4, the allocation monitor may cease causing garbage collection to occur until the total memory tracked is greater than the memory threshold.

At block 520, the actions cease.

Although some reference has been made to applying aspects of the present invention to memory associated with images, it will be recognized that aspects of the present invention may also be applied in other situations in which a pattern for obtaining and then not referencing memory is discovered.

As can be seen from the foregoing detailed description, there is provided a method and system for garbage collecting memory that is no longer referenced. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for performing garbage collection of memory blocks in a computing environment, wherein the method comprises:
   a computer allocating memory for storing one or more data objects, the allocated memory comprising allocated memory blocks, wherein the data objects include image objects and wherein the method further comprises updating a value that indicates how much unmanaged image data is associated with image objects in managed memory;
   storing a first time at which memory is allocated;
   allocating additional memory for storing the one or more data objects at a second time, the allocated additional memory comprising additional allocated memory blocks;
   determining a first elapsed time corresponding to a difference in time between the first and second times; and
   in response to determining the first elapsed time is greater than or equal to a first time threshold, using a garbage collector to perform a garbage collection of unreferenced memory blocks, by collecting unused memory from the allocated memory blocks and additional allocated memory blocks, wherein the first time threshold is greater than a duration of time in which the computer having the memory allocates for images, and wherein the method further includes refraining from performing the garbage collection while the value is less than a predetermined memory threshold.

2. The method of claim 1, further comprising:
   storing a third time at which a previous garbage collection occurred;
   determining a second elapsed time between the first and third times; and
   upon determining the second elapsed time is greater than or equal to a second threshold, using the garbage collector to perform an additional garbage collection of unreferenced memory blocks.

3. The method of claim 1, wherein more unmanaged memory is allocated to the one or more data objects than managed memory.

4. The method of claim 1, wherein the data object comprises an image object and wherein said storing the first time at which memory is allocated only occurs when it is determined that the image object is created in managed memory in response to an application programming interface request.

5. The method of claim 1, wherein said storing the first time at which memory is allocated occurs when it is determined that the memory allocation has occurred within a predetermined short period of time after a previous memory allocation.

6. The method of claim 1, wherein storing the first time at which memory is allocated occurs in direct response to a managed object calling an allocation monitor to report a size of unmanaged memory referenced by a managed object.

7. The method of claim 1, wherein the first threshold is greater than a duration of time in which a computer having the memory allocates memory for images.

8. The method of claim 1, wherein the first threshold is one second.

9. The method of claim 1, wherein the first threshold is a time that is fixed at development time.

10. The method of claim 1, wherein the first threshold is a user tunable time.

11. The method of claim 1, wherein the first threshold is one of a plurality of user selectable times that are selectable at runtime.

12. The method of claim 1, wherein the garbage collection frees up unmanaged memory that was previously allocated for use by a program and that is no longer referenced by the program.

13. The method of claim 12, wherein the garbage collection returns the unmanaged memory referenced by the object to a free pool of memory.

14. The method of claim 1, wherein the garbage collector comprises a generational garbage collector in which objects that are longer-lived are associated with generations and wherein the garbage collector collects unused memory associated with each subsequent generation at a lower frequency than an immediately prior generation.

15. A computer program product comprising one or more computer-readable storage media having stored computer-executable instructions which, when executed by a computing system, implement the method recited in claim 1.

16. The computer program product recited in claim 15, wherein the computer program product comprises a computing system having a processor and system memory storing the computer-executable instructions which are executed by the processor.

* * * * *